United States Patent [19]

McElroy

[11] 4,235,135
[45] Nov. 25, 1980

[54] BORING BAR ATTACHMENT FOR ENGINE LATHES

[76] Inventor: Arthur H. McElroy, P.O. Box 15580, Tulsa, Okla. 74112

[21] Appl. No.: 38,447

[22] Filed: May 14, 1979

[51] Int. Cl.³ .......................... B23B 3/00; B23B 5/36
[52] U.S. Cl. ........................................ 82/2 R; 82/15; 82/34 R; 82/36 R
[58] Field of Search .................. 82/2 R, 12, 15, 34 R, 82/36 R

[56] References Cited

U.S. PATENT DOCUMENTS

| | | | |
|---|---|---|---|
| 315,271 | 4/1885 | Gates | 82/15 |
| 332,065 | 12/1885 | Evans | 82/15 |
| 470,879 | 3/1892 | Richards | 82/36 R |
| 728,013 | 5/1903 | Rich | 82/15 |
| 785,828 | 3/1905 | Peelle | 82/36 R |
| 1,099,500 | 6/1914 | Hesketh | 82/2 R |
| 1,217,481 | 2/1917 | Mewes | 82/15 X |
| 1,346,230 | 7/1920 | Canales | 82/15 X |

*Primary Examiner*—Harrison L. Hinson
*Attorney, Agent, or Firm*—Head & Johnson

[57] ABSTRACT

A boring bar attachment for engine lathes to cut accurate internal diameters or to cut positive or negative tapers within relatively long and/or large diameter cylinders. The attachment includes a support bar which is readily attached at one end to the lathe chuck and positioned internally of the cylinder, while the other end is supported on the cross-bar of the lathe. A travelling cutter is slidably supported upon the bar and longitudinally movable by a variable speed motor-driven lead screw.

6 Claims, 5 Drawing Figures

BORING BAR ATTACHMENT FOR ENGINE LATHES

BACKGROUND

This invention pertains to attachments for lathes.

A typical engine lathe has not been effective to accurately machine the internal diameter or to taper relative long and/or large cylinders. Heretofore, in order to machine such cylinders on a lathe, the cutting tool would have to extend from one end, on a cantilevered support and lead screw, into the interior of the cylinder. The cantilever support has been known to bend, the cutter vibrate or chatter and, thus give inaccurate internal diameters. Devices heretofore known to overcome this problem have not been adaptable to long, large diameter work pieces, nor have they been able to create internal tapers, and are not easily attached or removed from the lathe. In addition, devices supported at both ends have been unable to attain the needed accurate placement of the cutting tool relative to the center axis of the lathe.

SUMMARY

It is an object of this invention to provide a boring bar attachment which will readily correct an engine lathe into a precise boring machine for cutting accurate internal diameters or adjusted to cut positive or negative tapers. The attachment provides for cutting tool rigidity by support means at each end of the bar, one end being supported by the lathe chuck while the other end is supported to the carriage cross slide. The invention further provides a travelling cutting tool that is supported upon the attachment which is powered separately from the lathe power system for variable longitudinal travel.

DETAILED DESCRIPTION OF THE DRAWINGS

Before explaining the present invention in detail, it is to be understood that the invention is not limited in its application to the details of construction and arrangement of parts illustrated in the accompanying drawings, since the invention is capable of other embodiments and of being practiced or carried out in the various ways. Also, it is to be understood that the phraseology or terminology employed herein is for the purpose of description and not of limitation.

Figure 1:
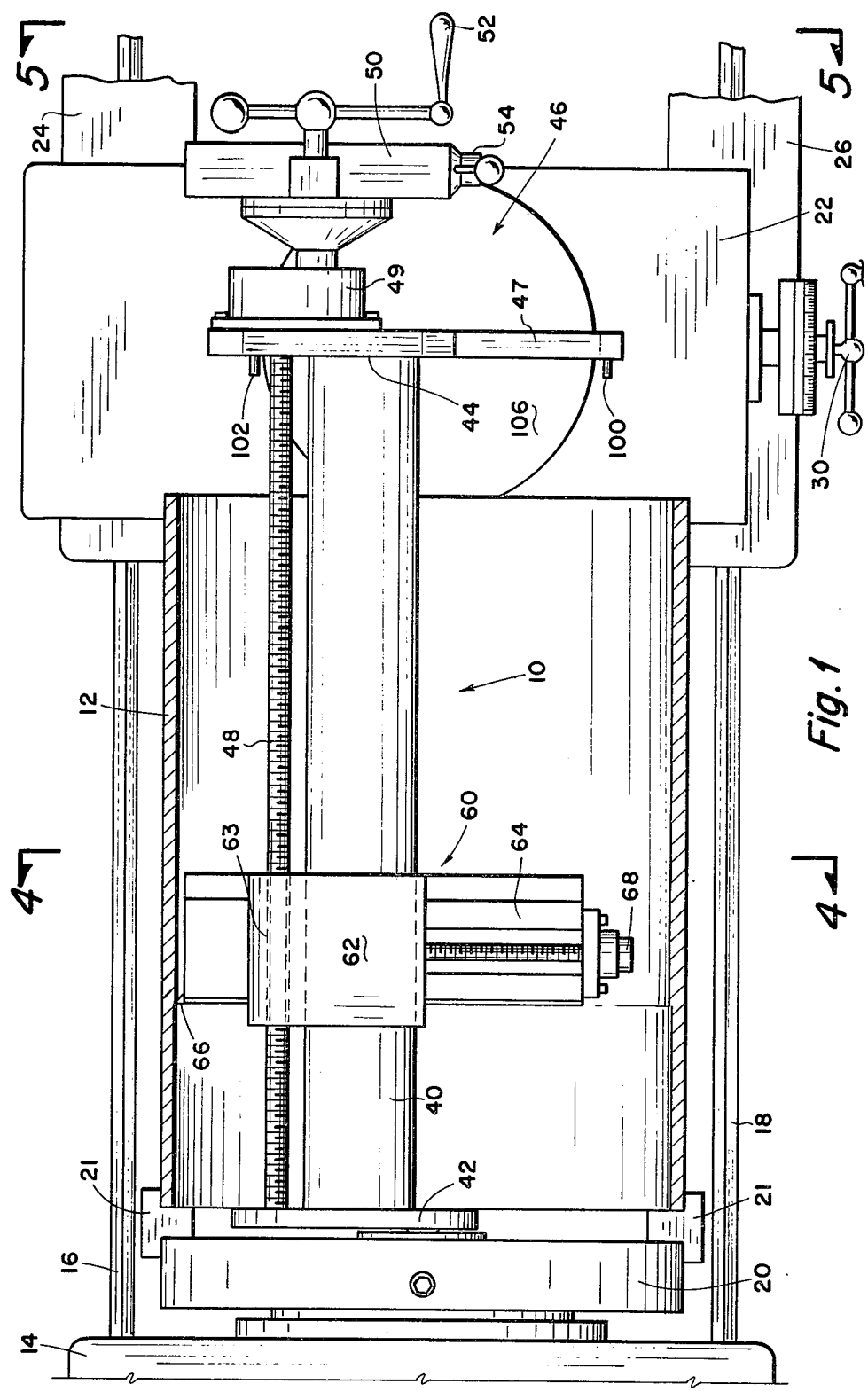
FIG. 1 is a top plan view, partially sectional, of the boring bar attachment and lathe.

Referring now to the drawings and, in particular to FIG. 1, the boring bar of this invention is generally designated by the numeral 10. The boring bar is positioned and attached to an engine lathe as hereinafter described within the work piece, or cylinder 12, to which the internal diameter is to be cut or tapered. The engine lathe is of typical design and the details of construction thereof are not elaborated upon but are well-known to those skilled in the art. Generally, the lathe includes a basic frame and housing 14 for rotary power supply. Attached thereto and extending longitudinally and parallel to the axis of the lathe are ways 16 and 18. At the power end of the lathe a rotatable chuck 20 is provided, which includes well-known means for holding work piece 12, such as radially moving clamps 21. These clamps are adapted to retain and position the work piece 12 coaxial with the rotary axis of the lathe. The right hand end of the lathe generally includes a tail stock member (not shown) which is movable along the ways 16 and 18 but is not usable with the attachment of this invention. A carriage 22 is positioned upon carriage support members 24 and 26, the entire assembly of which rides upon the respective ways 16 and 18 and is thus movable along the bed of the lathe to a desired position. The carriage 22 is adapted to move transversely to the axis of the lathe by operation of an internal lead screw (not shown), which movement is controlled by rotation of feed handle 30. The feed mechanism includes a typical indexing mechanism for precise incremental movements of the carriage, which is important when using the boring bar attachment to accurately line-up same in the desired cutting operation.

Figure 2:
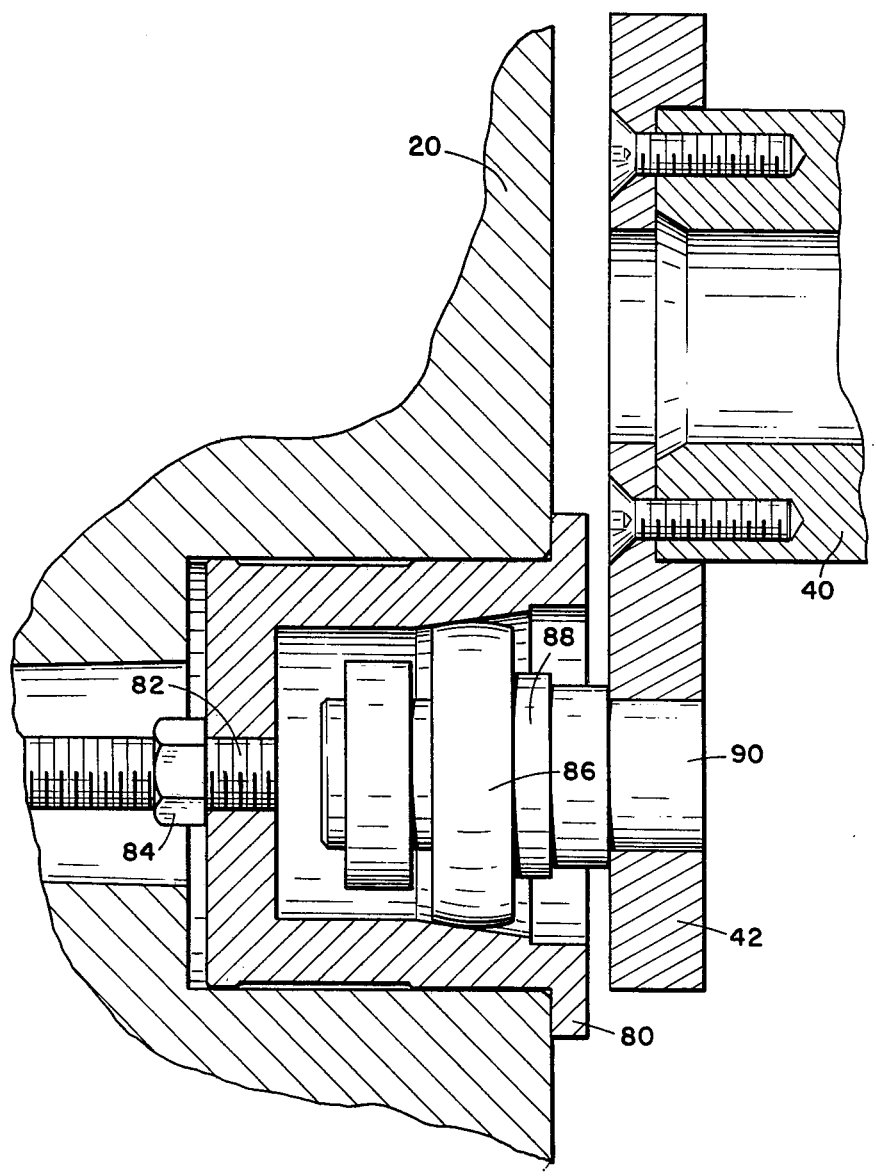
FIG. 2 is a partial sectional view describing the manner of attaching one end of the boring bar to the chuck end of the lathe.

The boring bar attachment 10 includes a longitudinal support bar 40, which, at its first or chuck end, includes a chuck support plate 42, which, in turn, includes the chuck support assembly more aptly described in FIG. 2. The second, or carriage, end of the support bar generally indicated by the numeral 46, is attached to the carriage by a vertical support 47 extending upwardly from a base plate 106. A lead screw 48 parallel to support bar 40 is rotatably supported to the support plate 42 at the chuck end and to the vertical support 47 at the carriage end. The lead screw is driven by a separate power means which includes a reduction gear 49 and variable speed and reversible motor 50, to which electrical leads 51 supply electrical power thereto. Handle 52 provides manual operation of the lead screw 48 for accurately setting the cutter 66 during the set-up. Switch 54 operates the motor. The system includes a fast-return system, not shown.

The travelling block assembly generally designated by the numeral 60 includes a travelling block 62, which is supported on support bar 40 for non-rotary longitudinal movement therewith, being driven by the action of lead screw 48 in the threaded opening 63 of the travelling block. The assembly includes a cross-slide 64 of a typical dovetail connection 65 for movement transversely to the rotary axis of the lathe and includes micrometer indexing means 68 for accurately positioning cutting tool 66 positioned at the end of the cross-slide.

Referring now to FIG. 2, the chuck supported end of the support bar 40 is shown. Generally, this assembly includes a pivotal ball-socketlike arrangement which permits accuracy in alignment of the boring bar, especially for creating an internal taper to the work piece 12. This assembly comprises generally a socket member 80, which is locked into position within the center of chuck 20 as in this instance by a threaded connection 82 and lock nut 84. An internally tapered socketlike surface supports therein a partial spherical member 86. The member 86 provides relative rotation via bearings 88 on shaft 90, which is fixed to support plate 42.

Figure 3:
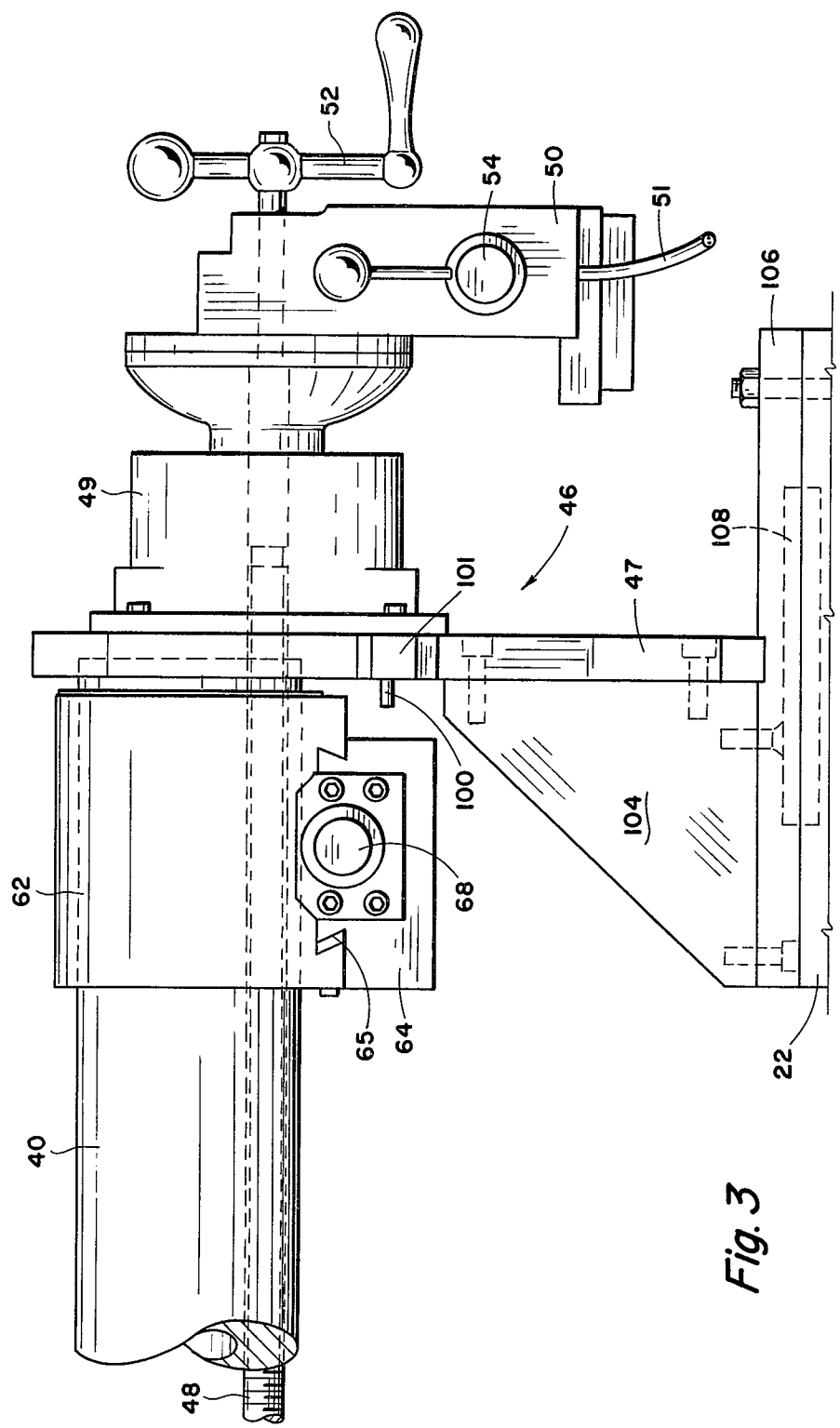
FIG. 3 is a side view describing the support of the other end of the boring bar attachment to the lathe carriage.

In FIG. 3 the second end or carriage supported end is shown in side elevation. The vertical support member 47 includes alignment pins 100 (supported on arm 101 and 102 (seen in FIGS. 1 and 5), which are utilized as hereinafter described to align the boring bar attachment to the center of the axis of rotation of the work piece. The vertical carriage support member 47 is attached to base member 106 by a vertical support 104. Base 106 is then attached to the carriage and fixed into position through a cylindrical bearing-like connection 108 between plate 106 and carriage 22, which permits relative rotation of the carriage support assembly 46 relative to the carriage. This movement is particularly important when it is desired to make a taper cut as hereafter described.

Figure 4:
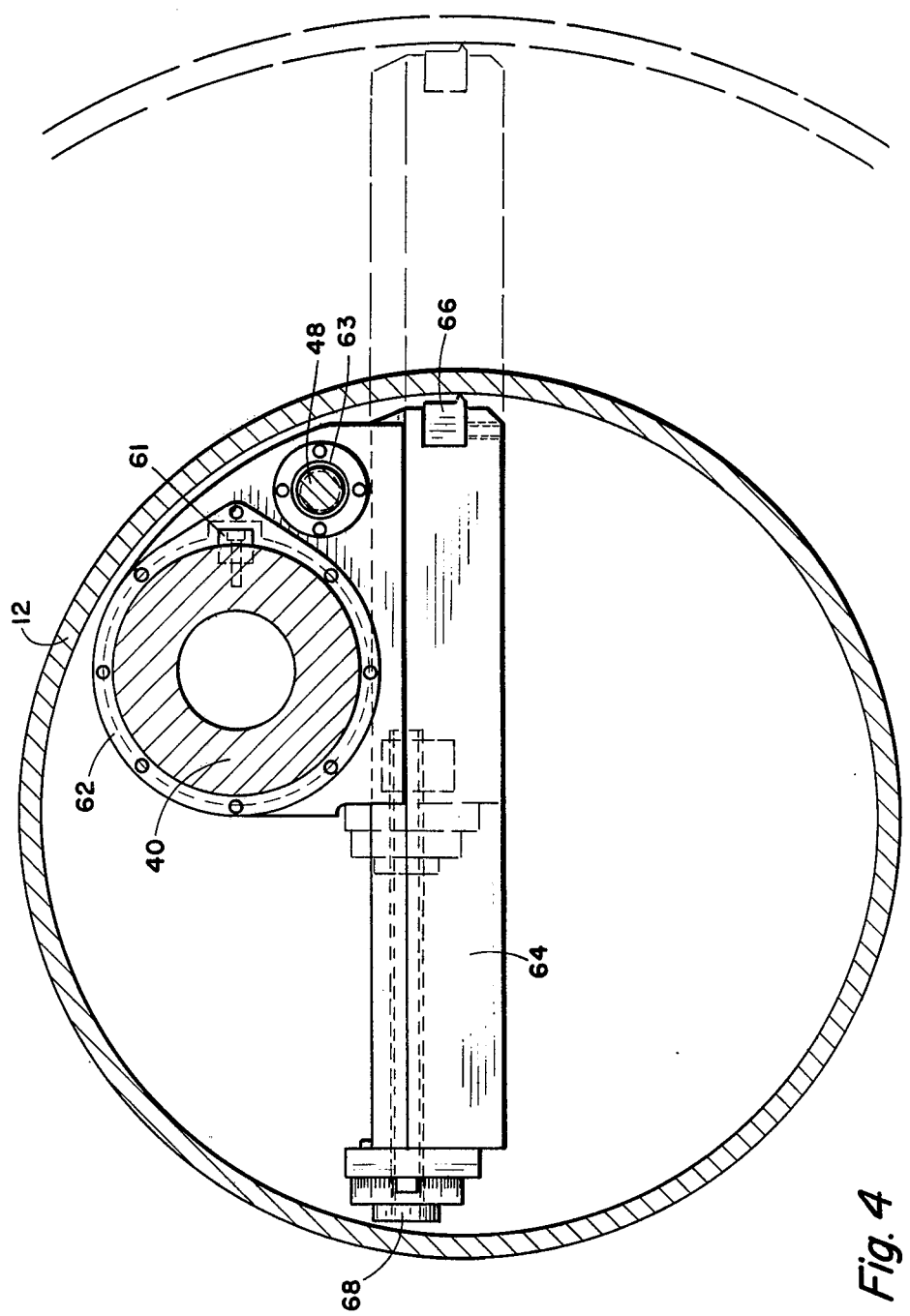
FIG. 4 is a sectional view taken along the line 4—4 of FIG. 1.

Referring now to FIG. 4, some of the details of the boring bar attachment are shown in cross-section. As shown, the travelling block 62 includes a key-slide 61 to prevent rotational movement of the travelling block. The dotted-line portion is to show the extent of the travel of the cross-slide 64 relative to varying diameter work pieces.

Figure 5:
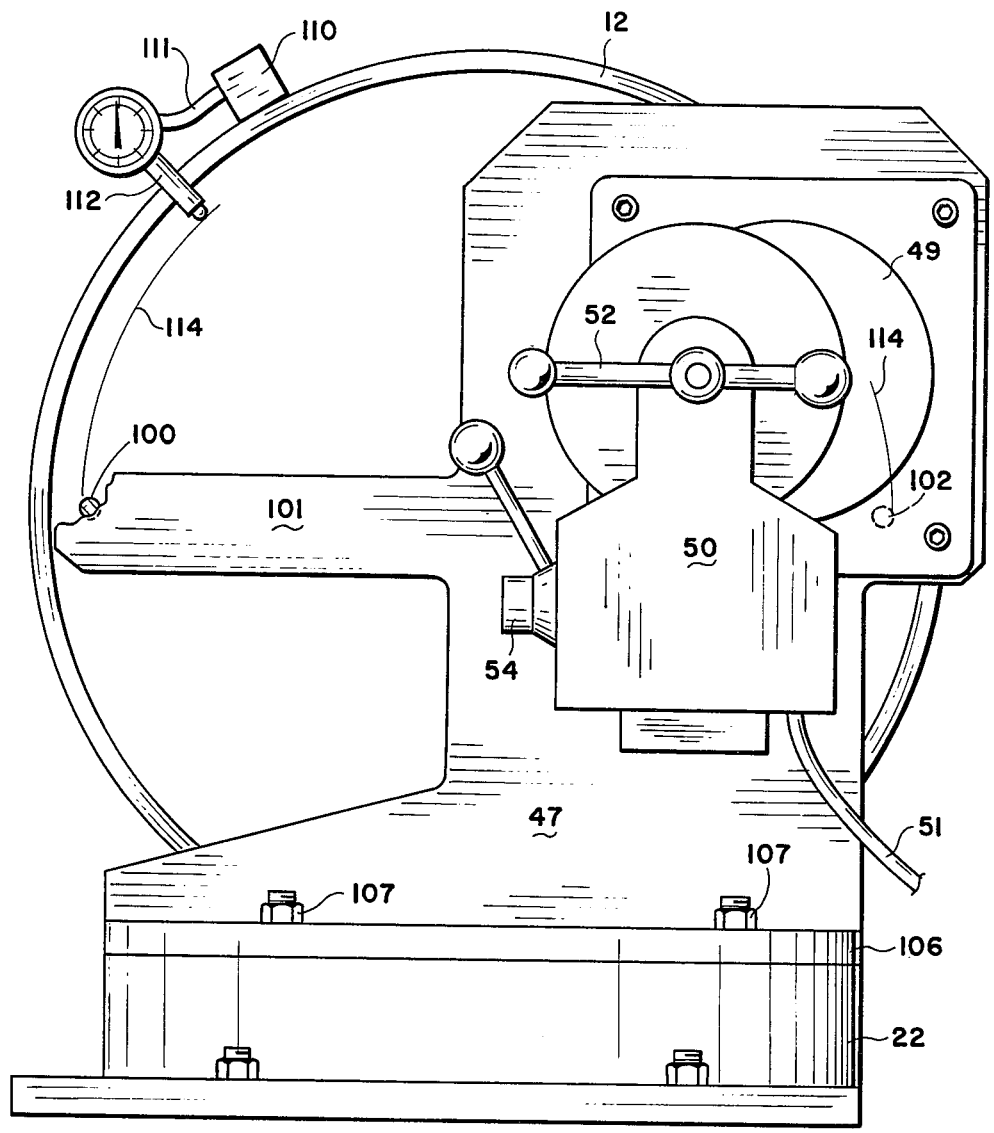
FIG. 5 is an end view taken along the line 5—5 of FIG. 1.

Referring now to FIG. 5, an important aspect of the invention is the alignment of the boring bar relative to work piece 12. This is accomplished using well-known instrumentation including a holder 110, which is usually magnetically attached to the work piece 12 and by way of extension arms 111 support a sensitive feeler gauge 112.

OPERATION

The invention herein described is particularly applicable to large diameter and/or lengthy cylindrical work pieces 12 for cutting the internal diameter to a precise measurement or to a precise internal tapered cut upon a standard engine lathe. In operation, socket member 80 would be attached to the center of the chuck 20. The work piece 12 is clamped to the chuck and supported for rotational and co-axial movement therewith by clamps 21. The boring bar attachment assembly 10 is inserted into the work piece such that the first end is positioned within the center of the chuck through the ball-socket connection shown in FIG. 2. The next operation is to accurately center the boring bar attachment relative to the axis of rotation. A feeler gauge 112 is positioned so as to be supported upon the work piece 12 as, for example, using a permanent magnet attachment member 110 and extension arms 111 such that the feeler gauge will strike outside tangent of alignment pin 100. The work piece 12 with the feeler gauge attached is then rotated to a position opposite alignment pin 102. Any misalignment is corrected by incremental moving of the carriage 22 by rotation of carriage feed handle 30, transversely until an imaginary arc 114 of the feeder gauge relative to pins 100 and 102 represents co-axial alignment of the boring bar attachment relative to the center of rotation of the work piece 12. The carriage is locked and nuts 107 are tightened to retain the boring bar attachment in that position. The traveling block assembly is then positioned at the carriage end. Cross-slide 64 is moved so as to position single point cutting tool 66 adjacent the end of work piece 12 at the desired internal diameter. Once this position is reached the motor 50 is turned on to advance the traveling block assembly 60 at a desired speed using the variable speed control. Once the traveling block assembly has reached the chuck end of the boring bar and the cutting action completed a rapid transverse mechanism is provided for returning the traveling block assembly to the carriage support end. It is to be understood that the travel of the cutter may be from the chuck end to the carriage end. The boring bar attachment is removed and the work piece 12 unclamped from the chuck.

In the event that a taper cut, either positive or negative, is desired, the nut 107 retaining base 106 to the carriage 22 are loosened and/or any other interconnections that will permit base 106 to rotate relative to the transverse movement of carriage 22. The amount of travel of the carriage to arrive at the desired taper is accomplished using the formula:

$$x = l \times a$$

where: "x" equals the transverse movement of the carriage from a given position; "l" equals the length of the work piece; and "a" equals the desired taper angle. Base 106 is then fixed to the carriage by tightening nuts 107. Thus, a unique feature of this invention is the ability to use the carriage cross-slide to accurately generate a desired taper within a long or relatively large work piece.

What is claimed is:

1. In a boring bar attachment for cutting accurate internal diameter or taper long and large diameter cylinders on an engine lathe, the lathe having a carriage frame, a chuck to which one end of the cylinder is rotatably mounted about a given center axis, and means to rotate the chuck, the improvement in the boring bar for attachment to the lathe, comprising:

a support bar, longer than the cylinder and positioned inside thereof, the bar having a first end and a second end, the first end having chuck support means non-rotatably attached to the chuck, the second end having an assembly supported upon the carriage beyond the other end of the cylinder, a lead screw rotatably supported to and extending from the first to the second end parallel to the axis of the support bar, and variable power means supported at the second end to rotate the lead screw at a desired speed, a travelling block assembly supported upon the support bar for longitudinal movement thereon, a threaded opening in the block to receive the lead screw and thus slide the block for travel from the second end to the first when the lead screw is rotated in one direction and vice versa when the lead screw is rotated in a reverse direction, the travelling block assembly including a cross-slide supported upon the travelling block for movement transverse to the support bar, means to support a cutting tool at one end of the cross-slide adjacent the internal diameter of the cylinder, and means to accurately move the cross-slide to a position, relative to the internal diameter of the cylinder, to create the desired internal diameter or taper.

2. The attachment of claim 1, the further improvement in the chuck support means comprising a socket attached to the center of the chuck, a partial spherical member attached to the first end and pivotal in the socket, and means to pivot the second end assembly about an arc which has its center at the center of the partial spherical member.

3. The attachment of claim 2 including an arm transverse to the center axis, one end of which supports the partial spherical member and the other end supports the first end of the support bar and lead screw.

4. The attachment of claims 1, or 2, or 3, the further improvement in a variable speed control for the power means, a gear reduction means, and a quick return means to move the travelling block from the first end to the second end.

5. The attachment of claim 1 including means to align the second end relative to the center axis.

6. The attachment of claim 1 wherein the cylinder is of length substantially equal to the length of the carriage bed of the lathe less the width of the second end assembly.

* * * * *